J. G. BLESSING.

AUTOMATIC TELEPHONE SWITCHING APPARATUS.

APPLICATION FILED MAR. 7, 1917.

Reissued Mar. 22, 1921. 15,068.

10 SHEETS—SHEET 1.

Inventor
John G. Blessing
By E. D. Fales
Attorney

J. G. BLESSING.

AUTOMATIC TELEPHONE SWITCHING APPARATUS.

APPLICATION FILED MAR. 7, 1917.

Reissued Mar. 22, 1921.

15,068.

10 SHEETS—SHEET 2.

Inventor
John G. Blessing.
By E. D. Fales.
Attorney

J. G. BLESSING.

AUTOMATIC TELEPHONE SWITCHING APPARATUS.

APPLICATION FILED MAR. 7, 1917.

Reissued Mar. 22, 1921. 15,068.

10 SHEETS—SHEET 3.

Inventor
John G. Blessing.
By E. D. Fales.
Attorney

J. G. BLESSING.

AUTOMATIC TELEPHONE SWITCHING APPARATUS.

APPLICATION FILED MAR. 7, 1917.

Reissued Mar. 22, 1921. 15,068.

10 SHEETS—SHEET 4.

Inventor
John G. Blessing.
By E. D. Fales.
Attorney

J. G. BLESSING.

AUTOMATIC TELEPHONE SWITCHING APPARATUS.

APPLICATION FILED MAR. 7, 1917.

Reissued Mar. 22, 1921.

15,068.

10 SHEETS—SHEET 5.

Inventor
John G. Blessing
By E. T. Fates.
Attorney

J. G. BLESSING.

AUTOMATIC TELEPHONE SWITCHING APPARATUS.

APPLICATION FILED MAR. 7, 1917.

Reissued Mar. 22, 1921. 15,068.

10 SHEETS—SHEET 6.

Inventor
John G. Blessing
By E. D. Fales
Attorney

J. G. BLESSING.
AUTOMATIC TELEPHONE SWITCHING APPARATUS.
APPLICATION FILED MAR. 7, 1917.
Reissued Mar. 22, 1921.
15,068.
10 SHEETS—SHEET 7.
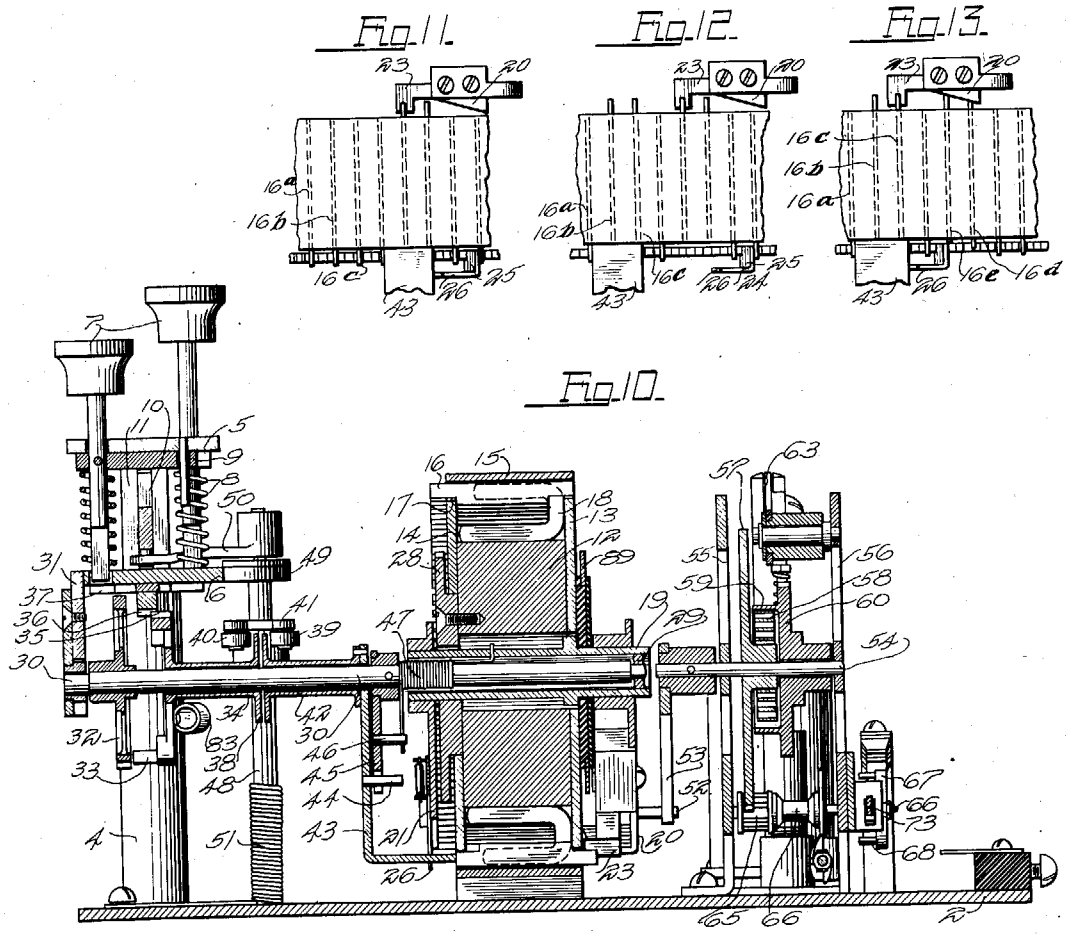
Inventor
John G. Blessing
By E. D. Fales
Attorney

J. G. BLESSING.

AUTOMATIC TELEPHONE SWITCHING APPARATUS.

APPLICATION FILED MAR. 7, 1917.

Reissued Mar. 22, 1921. 15,068.

10 SHEETS—SHEET 8.

Inventor
John G. Blessing.
By E. D. Fales
Attorney

J. G. BLESSING.

AUTOMATIC TELEPHONE SWITCHING APPARATUS.

APPLICATION FILED MAR. 7, 1917.

Reissued Mar. 22, 1921.

15,068.

10 SHEETS—SHEET 9.

Inventor
John G. Blessing.
By E. D. Fales.
Attorney

J. G. BLESSING.

AUTOMATIC TELEPHONE SWITCHING APPARATUS.

APPLICATION FILED MAR. 7, 1917.

Reissued Mar. 22, 1921.

15,068.

10 SHEETS—SHEET 10.

Inventor
John G. Blessing
By E. D. Fuller
Attorney

UNITED STATES PATENT OFFICE.

JOHN G. BLESSING, OF CHICAGO, ILLINOIS, ASSIGNOR TO AUTOMATIC ELECTRIC COMPANY, OF CHICAGO, ILLINOIS, A CORPORATION OF ILLINOIS.

AUTOMATIC TELEPHONE SWITCHING APPARATUS.

15,068. Specification of Reissued Letters Patent. Reissued Mar. 22, 1921.

Original No. 1,145,542, dated July 6, 1915, Serial No. 586,530, filed October 11, 1910. Application for reissue filed March 7, 1917, Serial No. 153,216.

*To all whom it may concern:*

Be it known that I, JOHN G. BLESSING, a citizen of the United States of America, and resident of Chicago, Cook county, Illinois, have invented a certain new and useful Improvement in Automatic Telephone Switching Apparatus, of which the following is a specification.

My invention relates to automatic or semi-automatic telephone exchange systems in general. It relates more particularly to systems of this kind, in which step-by-step actuated automatic switches are employed, having motion in one plane to find a group, and then motion in another plane at right angles to the first plane to find a line in the selected group. In some cases the line thus found will be a trunk line, in which case the automatic switch is of the kind known as a selector. In other cases the line thus found will be a subscriber's line, and in that event the switch will be of the kind ordinarily known as a connector. The rotation of a selector is, of course, purely automatic so that an idle trunk line is automatically selected. The rotation of the connector is, however, directly under the control of the calling subscriber, or the calling operator, if the system be semi-automatic.

Ordinarily, the calling mechanism, by which automatic switches of this or any other suitable character, are controlled, must be operated somewhat slowly, or at least not too fast, so that the transmission of the electrical impulses will properly control the switches. This, of course, in some cases, means that the calling operation will tend to delay the work of the operator or other person making the call, or at least absorb too much of the time and effort of such person, owing to the more or less deliberate manner in which the manual manipulation of the calling mechanism must be performed, for the reasons stated. Take, for example, the case of the system in which the automatic switches are controlled by the manual switchboard operator. In a system of this kind, and with the ordinary calling mechanism, the operator would be giving over a large amount of time and effort to the operation of the calling mechanism; whereas, if the said mechanism could be operated very quickly, the call could be made with despatch, and the operator would then be free to do something else.

It has been recognized, therefore, that, for various reasons, a calling mechanism that could be operated manually as fast as the operator is capable of working, and which would then more slowly transmit the electrical impulses leaving the operator, or other person, free to be doing something else, while the call is being transmitted, would be desirable, and some effort, so I understand, has been made along this line. So far, however, I do not understand that the results have been entirely satisfactory.

Generally stated, therefore, the object of my invention is to provide an improved and highly efficient calling mechanism of the kind in which the manual operation thereof is performed swiftly and as fast as the operator or other person is capable of working; and in which, while such person is then free to do something else, the electrical impulses are transmitted more slowly and in the manner calculated to properly control the automatic switches.

The special object of my invention is to provide a calling mechanism of this general character in which a single set of keys is sufficient for calling any number having a plurality of digits—that is to say, having provision whereby any key may be pushed or actuated more than once during the setting up of the call, in all cases where two or more of the digits of the called member are the same, thus rendering it unnecessary to employ more than the single set of keys for controlling the device by which the electrical impulses are transmitted.

A further object is to provide an improved method of spacing apart the different digits of any called number involving the use of an electro-magnet, which is energized one or more times to produce a pause or rest between the digits, so that there will be no danger of the transmission of current for one digit before the switching operation in accordance with the previous digit has been fully completed.

A further object is to provide a push button controlled calling mechanism having means including a clock spring and an electro-magnet energized in synchronism with the electrical impulses for winding up said spring, and whereby transmission of the impulses may follow at a variable distance behind the operation of the keys or push buttons by which the mechanism is controlled in accordance with the called number.

A further object is to provide improved means for varying the number of impulses necessary for each digit of the called number, involving a circular series of movable contacts, and means for skipping a number of contacts for each digit of the called number, and for actuating one or more contacts between the groups of skipped contacts, to space the digits apart, which skipping and actuating means are controlled by a set of keys or push buttons.

It is also an object to provide certain details and features of improvement and combinations tending to increase the general efficiency and serviceability of a telephone exchange system of this particular character.

To the foregoing, and other useful ends, my invention consists in matters hereinafter set forth and claimed.

In the accompanying drawings Figures 1, 2 and 3 taken together show a complete circuit connection between a calling manual substation A and a called automatic substation $A^1$ in a system embodying the principles of my invention. Fig. 1 shows the connection extended from the manual substation A through the operator's cord C to a trunk line leading to an automatic exchange. In Fig. 2 there is represented an automatic switching apparatus consisting of a line or trunk switch D, master switch E and selector switches F and H. In Fig. 3 there is represented a connector switch I, and a line switch $D^1$ which is individual to the line of substation $A^1$.

Fig. 10 is a view of a longitudinal section on the line 10—10 of Fig. 5.

Figs. 11 to 18, inclusive, are detail views of parts of the apparatus at different stages of its operation.

Fig. 19 is a view representing the circuit connections of the calling device.

Figure 20:
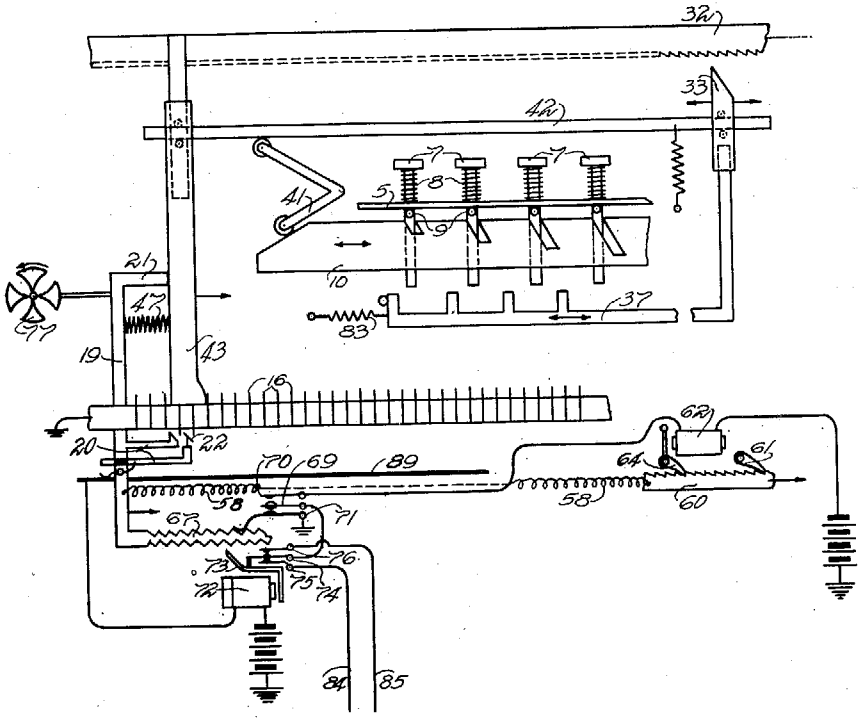

Fig. 20 is a diagram showing the principle of the mechanism in simplified form.

Figures 2, 4:
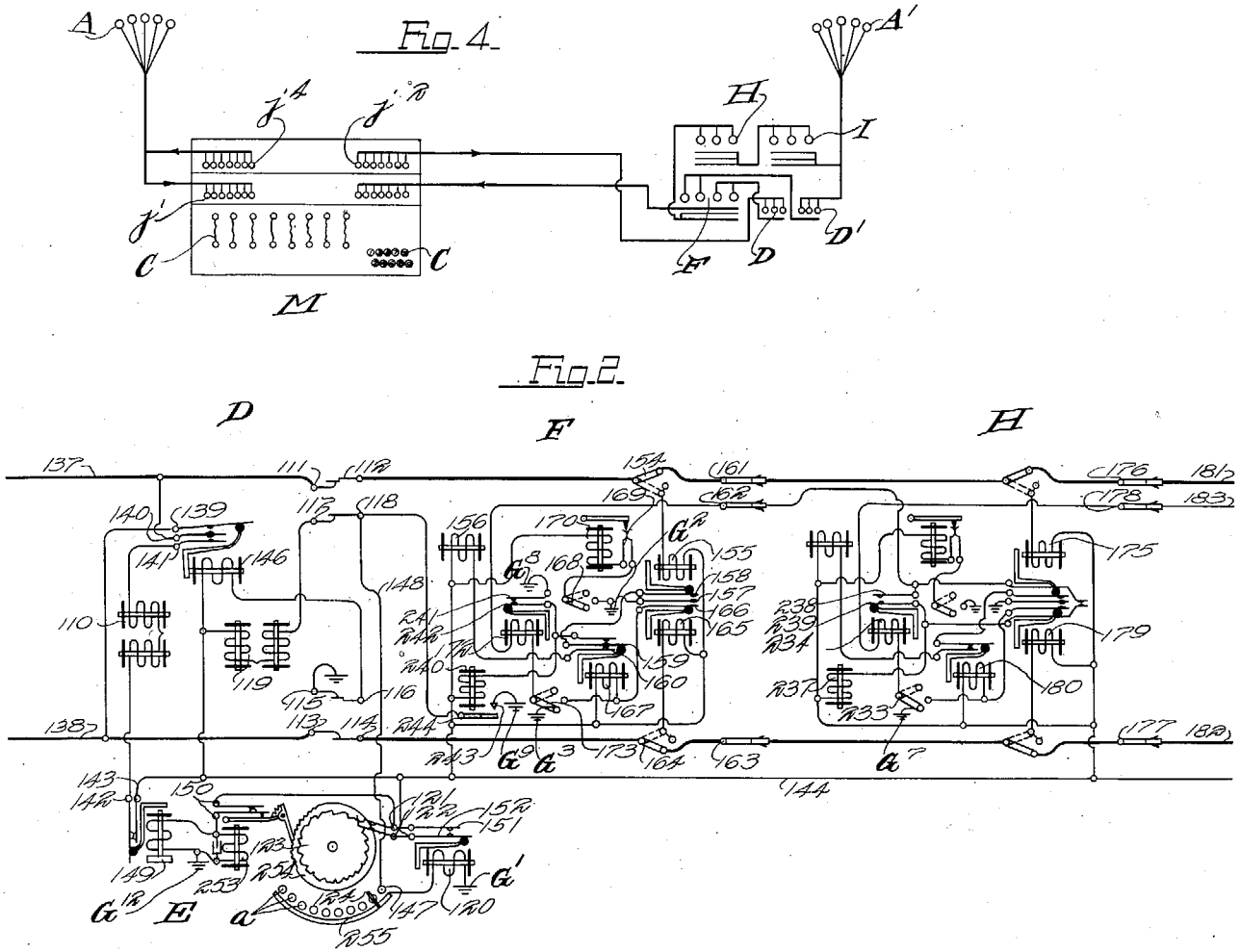
Fig. 4 is a diagrammatic representation of a system embodying the principles of my invention.

I shall first describe the construction and method of operation of the operator's calling device which is illustrated in Figs. 5 to 19, inclusive. In these figures 2 represents a suitable base near one end of which are mounted two upright posts 3 and 4 (Fig. 6), near the top of which are secured two flat cross pieces 5 and 6. In these cross pieces there are mounted ten push buttons 7. Each of these push-buttons is normally held in its uppermost position by a spring 8. The lower ends of the push buttons 7 are preferably flattened and extend into openings in the cross piece 6, but do not project below the lower surface thereof. To each of the push buttons 7 there is secured a laterally projecting arm 9 which normally engages the under side of the plate 5 to limit the upward motion of the button. When any button is pressed, its arm 9 is adapted to register with a diagonal slot in a bar 10. The bar 10 is loosely mounted at each end in a block 11, so that whenever any of the buttons 7 are pressed, the said bar will be forced to slide toward the left; as shown by dotted lines in Fig. 6.

Near the center of the base 2 there is mounted a drum consisting of a central portion 12 (Fig. 10), two end plates 13 and 14 and an outer casing 15. The plates 13 and 14 are provided near their peripheries with a number of slots in which are loosely supported the ends of a number of flat pins 16. Inside the drum these pins are provided near each end with a shoulder 17 which limits their motion in either direction. In order that the pins 16 may not slide too easily, each pin is provided with a U-shaped spring 18, one end of which is secured in a slot in the center piece 12, while the other end bears against the side of the pin. The lateral pressure of this spring on the pin produces sufficient friction to prevent the said pin from being affected by jars or vibration. Extending through the center of this drum there is a hollow shaft 19, to the ends of which are secured the arms 20 and 21. At its outer end the arm 20 is bent at right angles toward the plate 13 and is beveled, as shown in Figs. 11, 12 and 13, so that any projecting pins which it passes in its revolution will be forced back, flush with the plate 13. The arm 20 also carries two contact springs 22 and 23, Fig. 9. The end of spring 23 is V-shaped, so that whenever the said spring passes one of the pins 16 which is projecting from that side of the drum, the spring 23 is momentarily forced into contact with spring 22. The arm 21 carries at its outer end a bell crank 24, Fig. 7, one end of which is provided with a pawl 25 which is adapted to be forced into a notch of the ratchet wheel 28 when the end 26 strikes the arm 43. The ratchet wheel 28 is rigidly secured to the plate 14. Inside the hollow shaft 19 there is secured a small bushing 29 in which one end of the shaft 30 is journaled. The other end of the shaft 30 is journaled in the lug 31 which projects downward from the plate 6. Secured to the shaft 30 there is a ratchet wheel 32 which is adapted to be engaged by the pin 33 which projects from an arm which is attached to the sleeve 34. Also secured to the sleeve 34 there is a segment of a gear wheel 35 which meshes with a rack 36 secured to the under side of a plate 37 which is loosely mounted upon the under side of plate 6. The other end of the sleeve 34 is provided with a flange 38 which lies between the rollers 39 and 40 on the end of arm 41. On the shaft 30 there is a second sleeve 42 which has a flange projecting between the rollers 39 and 40. To the other end of the sleeve 42 there is secured an arm 43, the outer end of which is bent at right angles so as to engage the pins 16. From the arm 43 a pin 44 projects through a slot in an arm 45 which is secured to the shaft 30. With this arrangement, the arm 43 is forced to rotate with the shaft 30, but may be moved longitudinally along said shaft. From the arm 45 there projects a pin 46 against which one end of the coiled spring 47 bears. The other end of spring 47 is secured to the hollow shaft 19.

Figure 6:
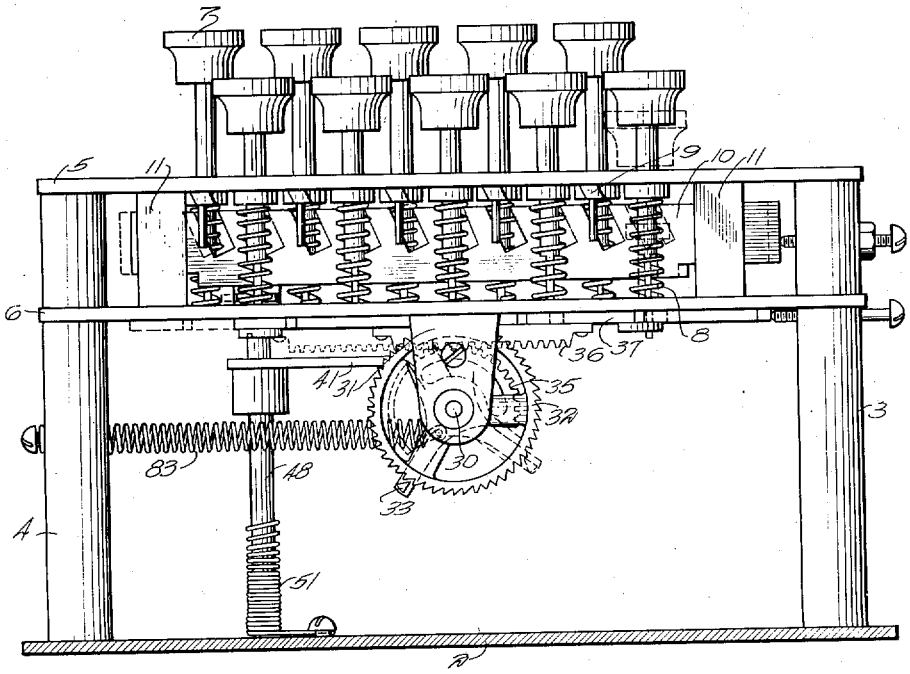
Fig. 6 is a sectional view on the line 6—6 of Fig. 5, but showing nothing beyond the line 7—7.
Figure 9:
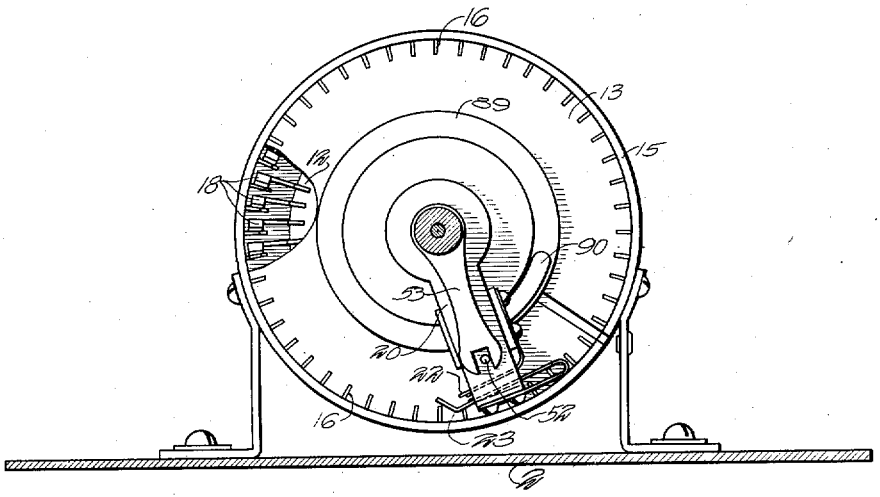
Fig. 9 is a view of a section on line 9—9, but showing nothing beyond line 7—7.

The arm 41 which carries the rollers 39 and 40 is attached to a vertical shaft 48 which is journaled at its lower end in the base 2, and near its upper end in the lug 49 which projects from the plate 6. To the upper end of the shaft 48 there is secured an arm 50 which is pivotally secured to the bar 10 (Fig. 6). The spring 51 tends to turn the shaft 48 in a counterclockwise direction, thus holding the end of the arm 43 against the plate 14, and causing two of the pins 16 to project through the other side of the drum, as shown in Figs. 11, 12 and 13.

Figure 8:
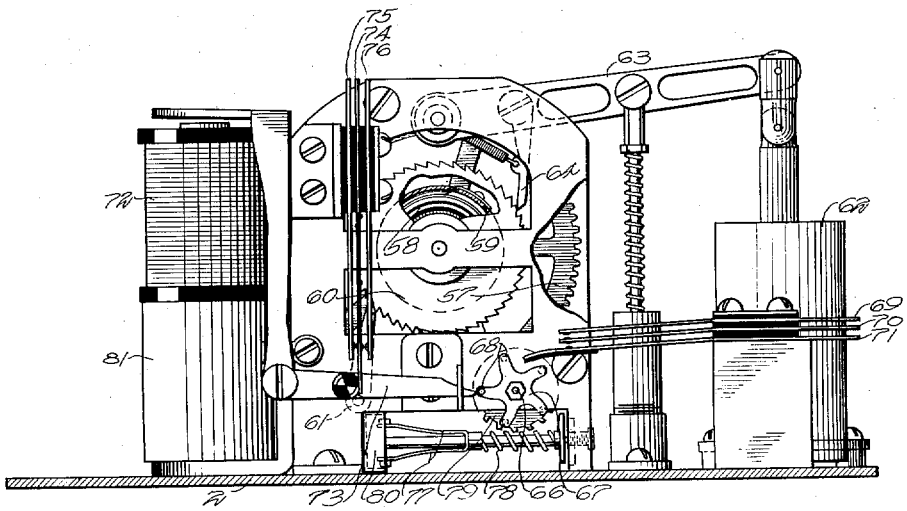
Fig. 8 is a view of a section on line 8—8, but showing nothing beyond line 9—9.

The arm 20 which is attached to the hollow shaft 19 is provided with a pin 52 which projects through an opening in the arm 53. The arm 53 is secured to the shaft 54 which is journaled in the side pieces 55 and 56 of a clockwork mechanism. To the shaft 54 there is secured a gear wheel 57, to the hub of which there is fastened one end of a coiled spring 58. The outer end of spring 58 is attached to the inside of a cup 59 which is formed on one face of a ratchet wheel 60. The ratchet wheel 60 is loosely mounted on the shaft 54. A pawl 61 (Fig. 8) prevents the ratchet wheel 60 from rotating backward. The wheel 60 may be rotated forward by means of the solenoid 62 through the medium of the arm 63 and pawl 64. Of course, it is evident that, if the wheel 57 is held stationary while the wheel 60 is being rotated, tension will be stored in the spring 58, tending to cause the wheel 57 to turn. The wheel 57 meshes with a pinion 65 (Fig. 10) which is secured to a shaft 66, to the end of which there is attached an impulse wheel 67 (Fig. 8). The impulse wheel 67 is provided with a number of arms 68 which momentarily press the springs 69, 70 and 71 into contact as the wheel revolves. At 72 there is represented a relay which, when energized, forces the end of the arm 73 into the path of the arms 68 and shifts spring 74 out of engagement with spring 75 and into contact with spring 76. The speed of operation of the mechanism is controlled by the governor springs 77. These springs 77 are secured to the worm gear 78 which registers with a gear 79 on the shaft 66. When the speed becomes too great the weights on the ends of the springs 77 move outward and rub on the walls of the cup 80, thereby producing a braking effect. The relay 72 is provided with a copper collar 81 around one end of its core, thus making it slow to deënergize when its circuit is broken.

Figure 14:
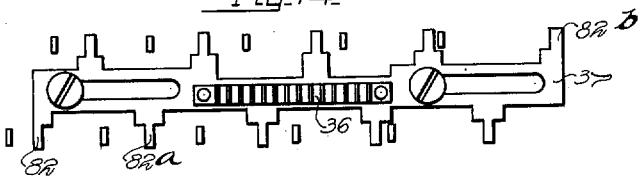
Figure 15:
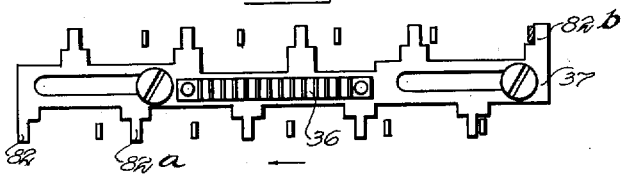

The plate 37 which is mounted on the under side of the plate 6 is provided with a number of laterally projecting arms 82, $82^a$, $82^b$, etc. Figs. 14 and 15 show the under side of the plate 37, together with the lower ends of the push buttons 7. Fig. 14 also shows the apparatus in normal position, in which position the distance from the lower ends of the #1 button to the arm 82 is one-third the distance from the #3 button to arm $82^a$, one-fourth the distance from the #4 button to its corresponding arm, etc. Fig. 15 shows the plate 37 in the position which it assumes when the #0 button is pressed and said plate has moved endwise until the arm $82^b$ strikes the projecting end of said button.

Referring to Fig. 19, it will be seen that the windings of relay 72 and magnet 62 are connected to the binding post 87, to which is connected the non-grounded terminal of battery B. The grounded terminal of the battery is connected to binding post 86 and thence to spring 71 and to the frame of the apparatus at 88, thence through the arm 20 (Fig. 9) to the spring 23. The spring 22 is insulated from the arm 20, but is connected with an insulated ring 89, through a wiper 90. The ring 89 is connected to the winding of relay 72. The spring 69 is connected with spring 74 and springs 75 and 76 are connected with the binding posts 84 and 85, respectively, to which the two sides of the line are connected when a call is being made.

Figure 17:
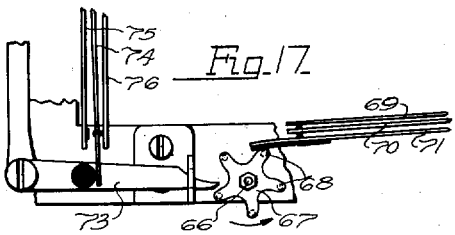
Figure 16:
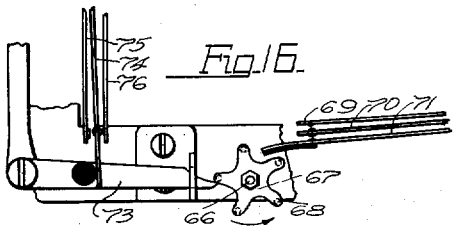
Figure 18:
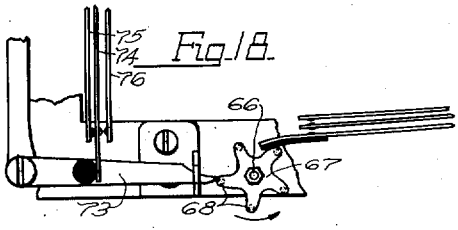
Figure 9:
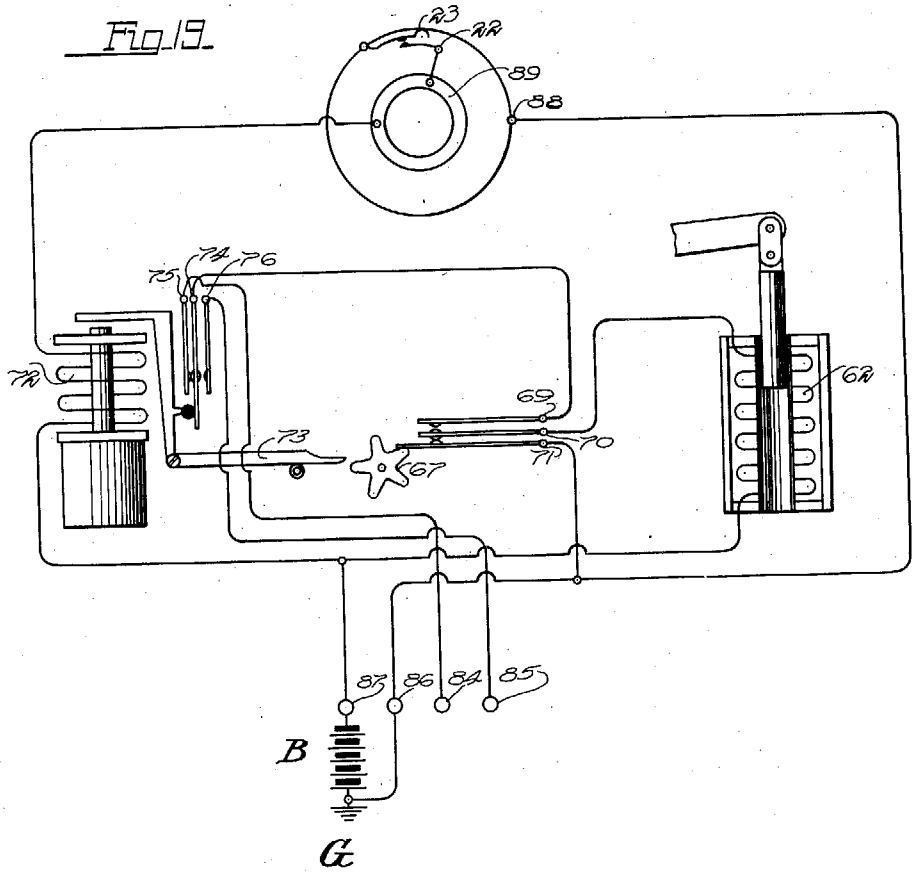

The method of operation of the mechanism is as follows: The tension of the spring 58 normally tends to rotate the gear wheel 57. This force is transmitted through the arm 53, pin 52, arm 20, and hollow shaft 19 to arm 21. This forces the end 26 of the bell crank 24 against the end of the arm 43, forcing the pawl 25 into a notch of the stationary ratchet wheel 28, thereby locking the mechanism. The arm 43 is prevented from rotating because it is held against the plate 14 and therefore engages the side of one of the pins 16. When the arm 43 is in normal position two of the pins 16 are forced to project through the opposite side of the drum, as shown in Fig. 11. The V-shaped end of the contact spring 23 normally rests between the two pins that thus project from the plate 13. Whenever it is desired to call a number, the buttons corresponding to the digits of that number are depressed in succession. When a button is pressed, the arm 9 attached thereto engages the corresponding slot in the bar 10, forcing the bar to the left (Fig. 6). This endwise movement of the bar 10 rotates the shaft 48 which, through the medium of the arm 41, withdraws the end of the arm 43 beyond the end of the pins 16 and forces the pin 33 into a notch of the wheel 32. As soon as the end of the arm 43 clears the pin against which it has been resting, the spring 47 causes said arm to be rapidly rotated. This rotation is transmitted through the shaft 30, wheel 32, and pin 33 to the toothed sector 35 which meshes with the rack 36. The rotation of the sector 35 causes the rack 36, and consequently the plate 37 to move endwise until an arm on the plate 37 strikes the end of the button which has been depressed. This engagement of the arm of the plate 37 with the button limits the travel of the arm 43. The arms on the plate 37 are so spaced that whenever any button is pressed, the arm 43 travels just far enough to pass a number of pins corresponding to the number of the button pressed. When the button which has been depressed is released, the spring 51 restores the bar 10 to normal position, forces the arm 43 against the plate 14 and withdraws the pin 33 from the wheel 32. When the pin 33 disengages the wheel 32 the plate 37 is restored to normal position by the spring 83 (Fig. 6) through the medium of the sector 35 and rack 36. When the arm 43 is forced against the face 14 of the drum, two of the pins 16 are forced through the plate 13 into the path of the spring 23, and the arm 43 is prevented from rotating farther by the next pin. As soon as the arm 43 disengages the end of the lever 24 when the button is pressed, the pawl 25 disengages the ratchet wheel 28 and the arms 20 and 21 begin to be rotated by the spring 58. These arms continue to rotate until the lever 24 again engages the arm 43, when the mechanism will be brought to rest with the end of the contact spring 23 resting between the ends of the pins which were last pushed out by the arm 43. The mechanism is so proportioned that each time the spring 23 passes the position of one of the pins 16, the impulse wheel 67 forces the springs 69, 70 and 71 into contact. The first pin which the spring 23 passes is projecting from the plate 13 so that the first time the springs 69, 70 and 71 are forced into contact the circuit of the relay 72 is closed by springs 22 and 23. The combined energization of the relay 72 and closure of springs 69, 70 and 71 completes a circuit from ground G through springs 71 and 69, and 74 and 76 to the binding post 85, and thence to the line which is connected therewith. Since the relay 72 is energized, the arm 73 engages one of the arms of the wheel 67, bringing the mechanism to rest just after the springs 22 and 23, and 69, 70 and 71 are disengaged. Fig. 17 shows the condition of this portion of the apparatus when the relay 72 is energized, and the springs 69, 70 and 71 are in contact. Fig. 16 shows how the impulse wheel 67 is stopped by the arm 73 after said wheel has advanced for enough to allow springs 69, 70 and 71 to disengage. The relay 72, being slow acting, holds its armature in its operated position for a short time, and then allows the arm 73 to be withdrawn from the path of the wheel 67, as shown in Fig. 18. The mechanism then begins to operate again, and the wheel 67 forces springs 69, 70 and 71 into contact a number of times, corresponding to the digit called, each time closing a circuit from ground G through springs 71 and 69, and 74 and 75 to binding post 84, and thence to the line connected therewith. After these impulses are delivered the springs 69, 70 and 71 are once more forced into contact, and at the same time the springs 22 and 23 are brought into engagement because the spring 23 has again reached a pin which is projecting into its path. The relay 72 again operates in conjunction with the impulse wheel to send a ground impulse to the binding post 85. It will be seen that each time the springs 69, 70 and 71 are forced into contact by the wheel 67, a circuit is closed from ground G through springs 71 and 70 and through the winding of the magnet 62 to the non-grounded terminal of battery B. Each time the magnet 62 energizes, it operates to rotate the wheel 60 (Fig. 8) one step to restore the tension to spring 58.

As the arm 20 rotates it restores all the operated pins 16 which it passes to normal position. Fig. 11 shows the arms 43 and 20 in a position of rest. Fig. 12 shows arm 43 just after the #1 button has been pressed and before the arm 20 has had time to start. The arm 43 has been withdrawn from its former position, rotated past one pin and then forced in again and come to rest against pin $16^a$, causing pins $16^b$ and $16^c$ to project from the other side of the drum. Fig. 13 shows the condition a little later—that is, just before the arm 20 has caught up with arm 43. In this position the pin 16[d] is almost restored and pin 16[e] is just beginning to be forced back.

With this calling device it is not necessary that the apparatus shall come to rest after one button is pressed and before the next button is operated. The buttons representing all the digits of any number may be pressed in rapid succession. The arm 43 will be rotated in a succession of steps. Each button that is pressed causes the arm 43 to be rotated past a number of pins, corresponding to the digit called, and then to force two pins into the path of the spring 23 on the arm 20. The arms 20 and 21 then follow at a slower speed, one impulse is sent over the line which is connected to the binding post 85 and the mechanism is stopped for a moment by the relay 72, as has been explained. The mechanism then starts again, sends a number of impulses, corresponding to the first digit, over the line which is connected to the binding post 84; then the spring 23 engages the next pin which was forced into its path by the arm 43, causing another impulse to be delivered to the line which is connected to the binding post 85, after which the mechanism will be momentarily stopped by the relay 72. This cycle of operations is repeated in turn for each digit until the arm 21 catches up with the arm 43. With this arrangement the impulses for each digit consist of one impulse over one side of the line, then after a pause a number of impulses are sent over the other side of the line, followed by a second impulse over the first side, then after a short interval of time, the impulses for the next digit are transmitted in the same order.

In order to give a clearer understanding of the operation of the calling mechanism, reference may be had to the diagrammatic drawing (Fig. 20). In this figure the various circular parts of the mechanism, such as the central drum with its circular row of pins 16 and the ratchet wheels 32 and 60, are shown developed into a straight line, and the movable parts are assumed to have a rectilinear motion. The arrows on the various parts show the direction of their movements. The double headed arrows represent movement in both directions. The impulse wheel 67 is represented in this figure by a straight bar provided with a plurality of impulse teeth. Referring to this figure, the mode of operation is as follows: Upon pressing one of the buttons 7 the bar 10 is forced to the left, thereby causing the arm 43 to be lifted above the top of the pins 16 and the catch 33 on the member 37 to be lifted into engagement with the teeth in the ratchet wheel 32. As soon as the end of the bar 43 is lifted above the top of the pins 16, the spring 47 forces said bar to the right until one of the projections on the member 37 engages the lower end of the push button which was depressed. When this occurs, the bar 43 will have passed completely over a number of pins 16 corresponding to the button pressed. When the button is released, the bar 10 returns to its normal position, whereupon the catch 33 is disengaged from the wheel 32 and the member 37 restored to the left to its normal position by the spring 83, and the bar 43 causes two of the pins 16 to be pushed through the drum. As soon as the bar 43 leaves the arm 21, the shaft 19 begins to be drawn to the right by the spring 58, its movement, however, being retarded by the governor 77. Upon the initial movement of said shaft, the finger 22 engages one of the pins which was depressed by the bar 43 in its original position, whereby the circuit of the slow acting relay 72 is closed. The relay 72, upon energizing, moves the locking member 73 into the teeth on the impulse wheel 67 and places the spring 74 into contact with the spring 76. After this occurs, the shaft 19 still moves to the left far enough to disengage the finger 22 from the pin 16 and to cause the spring 71 to make and break contact with the springs 69 and 70 before the impulse wheel is brought to rest by the stop 73. The engagement of the springs 71 and 69 while the relay 72 is energized transmits a single ground impulse to the line conductor 85. After sending this impulse, the shaft 19 remains at rest until the slow acting relay 72 has had time to deënergize to withdraw the locking member 73 from the impulse wheel 67. When this occurs, the shaft 19 resumes its movement, during which a series of impulses are transmitted from ground through the springs 71, 69, 74 and 75 to the line conductor 84. After a number of impulses corresponding to the push button which was depressed has thus been delivered to the line 84, the finger 22 engages the first pin which was depressed by the arm 43 in its advanced position, and transmits another impulse through the slow acting relay 72. The relay 72 operates in the same manner as before to cause a single impulse to be transmitted to the conductor 85 and then to momentarily bring the mechanism to rest. If, before the mechanism has been brought to rest, the second button has been pressed, the same cycle of operations above described will be repeated when the relay 72 deënergizes. If no other button has been depressed, the shaft 19 will simply move forward a short distance upon the deenergization of the relay 72, when it will be brought to rest by the engagement with the arm 43″.

The manual substation A (Fig. 1) with which I have elected to illustrate my invention may be of any suitable type, but, as herein illustrated, comprises the usual receiver 91, transmitter 92, switch hook 93, finger 94 and condenser 95. At the central office there is allotted to the line of substation A two conductors $j$ and $j^4$, a cut-off relay 97, line relay 98 and line lamp 99.

The operator's cord C may also be of any suitable type. As herein represented, the cord C is a well known type of cord circuit, modified slightly to adapt it for use either in connecting two manual lines or connecting a manual line with an automatic line. The answering end of the cord comprises a plug $p$, two supervisory relays 100 and 101 and a signal lamp 102. A battery B is provided for the purpose of furnishing current for operating the relays and for talking. The calling end of the cord is provided with a plug $p^1$, two relays 103 and 104, and a lamp 105. A push button 252 is provided through the springs of which the relay 104 is normally bridged between the two sides of the cord. When the button is in its depressed position the bridge through relay 104 is opened, and the two sides of the cord are connected to the opposite terminals of the battery through the relay 103 and impedance coil 153.

Figure 1:
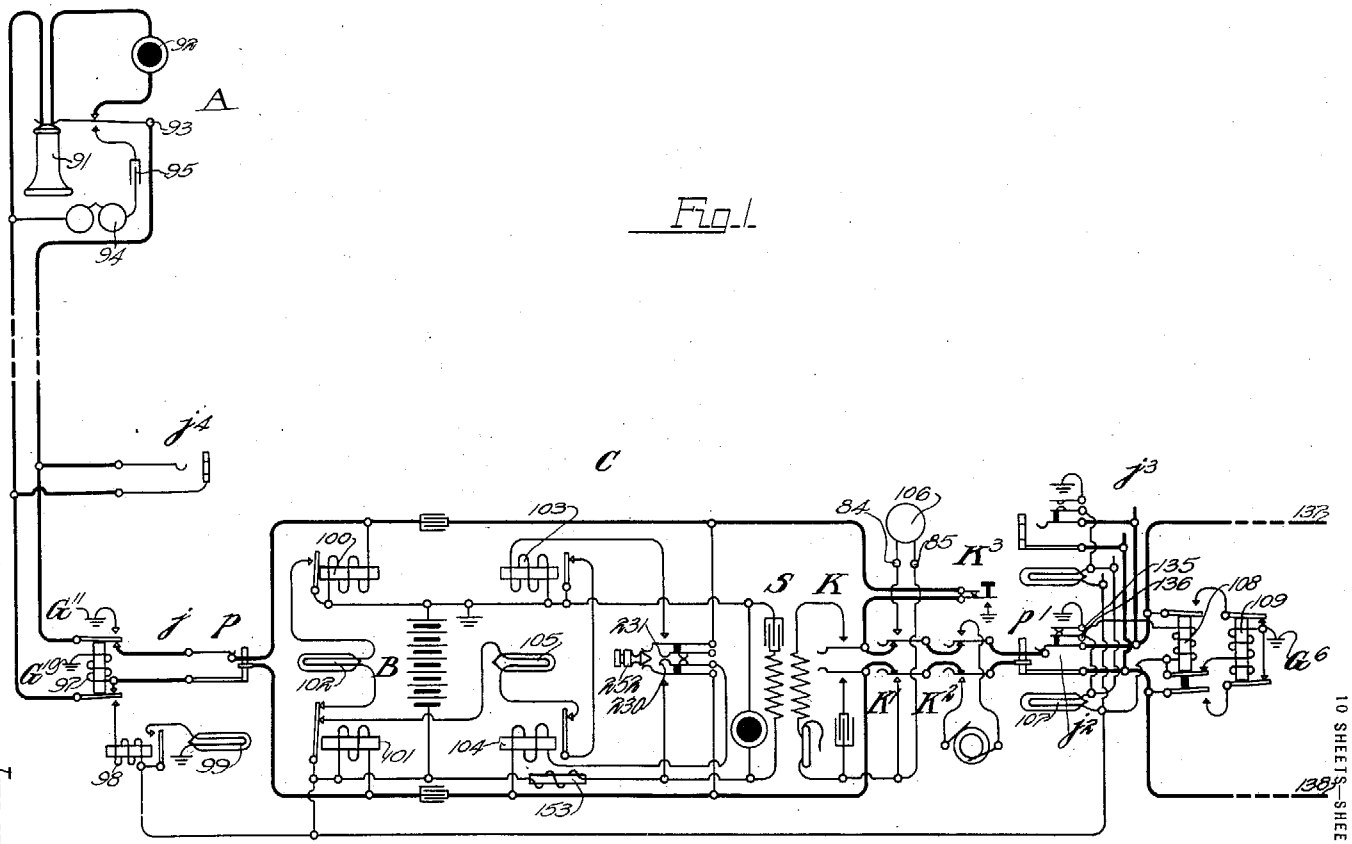

The calling end of the cord is also equipped with the usual ringing and listening keys $K^2$ and K, and with a calling device key $K^1$ by means of which a calling device similar to that shown in Figs. 5 to 19, inclusive, may be connected with the cord. In Fig. 1 the calling device is represented simply by a circle 106.

The trunk lines leading to the automatic exchange are provided with one or more jacks $j^2$, $j^3$, etc., with each of which there is associated a busy signal lamp 107. Each trunk line is also provided with two relays 108 and 109 which operate to cause the release of the automatic switches when the plug is removed from the jack.

The trunk switch D, Fig. 2, is similar to the line switch disclosed in British Patent #26,301, of 1906 and in the *American Telephone Journal* of New York, N. Y., of June 6, 1908. Among other details it comprises a plunger (not shown) adapted, when released by the energization of the trip magnet 110, to operate some one group of a number of groups of springs 111, 112, 113, 114, 115, 116, 117 and 118. The plunger is restored to normal position by the energization and deënergization of the release magnet 119.

The plungers of a number of line switches D are controlled by a master switch E, which is a slightly modified form of the general type of master switch disclosed in the said British Patent #26,301 of 1906, and the *American Telephone Journal* of June 6, 1908. It comprises essentially a motor magnet 253 for operating the ratchet wheel 254, and a bank of contacts comprising an individual contact $a$ for each trunk to which the switch D has access and a common segment 255. The ratchet wheel 254 is connected to the so-called plunger shaft (not shown) in such a manner that the rotary motion of said wheel transmits to the plunger shaft an oscillatory motion to move the plungers that are engaged therewith back and forth in front of the trunk terminals. The circuit of the motor magnet 253 is controlled by the relay 120 and also by springs 121 and 122. The springs 121 and 122 are controlled by the notched wheel 123 in such a manner that said springs can be disengaged only when the plungers that are engaged with the plunger shaft are directly in front of the terminal of a trunk line. The wiper 124 is attached to the plunger shaft and is adapted to always keep the segment 255 in electrical connection with the contact $a$ which belongs to the trunk line before which the idle plungers are being held by the plunger shaft.

The selectors F and H are of the well-known Strowger type disclosed in United States Letters Patent #815,321, granted March 13, 1906, to Keith, Erickson & Erickson.

The connector I is of the general type disclosed in United States Letters Patent #815,176, granted March 13, 1906, to Keith, Erickson & Erickson.

The automatic substation $A^1$ may be of any suitable type. As herein illustrated, the substation $A^1$ is provided with the usual receiver 125, transmitter 126, induction coil 127, switch hook 129, and ringer 130. To adapt the substation $A^1$ for operation in an automatic system it is also provided with two impulse springs 131 and 132 and an impulse wheel 133 which is secured to a shaft 134, to which there is also secured a dial (not shown) provided with finger holes.

In the diagrammatic representation of the system shown in Fig. 4, M represents a section of a manual switch board upon which terminate the lines of a group of substations A. This section of the board is provided with a number of cords C and one of my improved calling devices, represented at $c$. In this figure there is also represented a group of automatic substations $A^1$ terminating at an automatic exchange in line switches $D^1$. These line switches have access to selector switches F. In this figure the bank contacts of the selector switches and connectors are represented by three horizontal lines representing three different levels. A group of second selector switches H and connectors I is also shown. On the manual board M there is shown a group of jacks $j^2$, with the trunk lines leading therefrom to trunk switches D at the automatic exchange. Of course, it is to be understood that the manual board might consist of a number of sections similar to that shown here, and that the automatic exchange might comprise a number of groups of lines, with their accompanying line, selector and connector switches.

In the drawings a plurality of batteries B are shown. Only one battery may be used, however, or, preferably, one in each exchange.

Having given a general description of the apparatus, I will now explain how a connection is established between the substations A and A′, showing how the automatic switches are controlled through the medium of the improved calling mechanism disclosed herein. The operator at the manual board is signaled by the subscriber in the usual manner by the removal of the receiver from the switch hook, which act closes the circuit of the line relay 98, causing it to attract its armature to close the circuit of lamp 99. The operator thereupon inserts the plug *p* into the jack *j*, whereby a circuit is closed extending from ground $G^{10}$ through the cut-off relay 97, sleeve of jack *j* and plug *p* and through relay 101 to the battery B. The relay 97, upon energizing, disconnects the ground $G^{11}$ and relay 98 from the calling line and extends said line through the jack *j* and plug *p* to the cord C. The relay 101, upon energizing, connects the lamps 102 and 105 to the non-grounded pole of battery B. The lamp 105 is lighted by this action, but the circuit of lamp 102 is maintained open by relay 100. After ascertaining that a subscriber of the automatic exchange is desired, the operator inserts the plug *p′* into the jack $j^2$ and operates the key K′. The insertion of the plug *p′* into the jack $j^2$ connects the cord C with a trunk line leading to a trunk switch D of the automatic exchange, and by closing contact between springs 135 and 136 causes the busy signal lamp associated with each jack belonging to this trunk to be lighted. The closure of contact between springs 135 and 136 also closes a circuit through the relay 108 which, upon energizing, in turn closes a circuit through relay 109. These two relays remain energized until the plug *p′* is removed. The operation of the key K′ previously mentioned disconnects the plug *p′* from the cord and connects the calling device 106 with the trunk line leading to the automatic exchange. The so-called vertical side of the trunk 137 is connected with the binding post 84 of the calling device, and the rotary side of the trunk 138 is connected with binding post 85. Assuming that the number of the substation desired is #2220, the operator now presses the #2 button three times and the #0 button once. The calling device then operates in the manner explained to transmit the required ground impulses for causing the automatic switches to extend the connection to line #2220. The first impulse is transmitted from ground through binding post 85, over trunk conductor 138, through springs 139, 140 and 141 of switch D (Fig. 2), trip magnet 110 and springs 142 and 143 to battery lead 144, thence through the battery B to ground G. The energization of magnet 110 allows the plunger of the switch D to be released to press springs 111, 113, 115 and 117 into contact with springs 112, 114, 116 and 118, respectively. The engagement of springs 115 and 116 completes the energizing circuit for the cut-off relay 146, which operates to disconnect the trip magnet 110 from the trunk conductors 137 and 138. The engagement of springs 111 and 113 with the springs 112 and 114 extends the trunk conductors 137 and 138 through to the selector F. The engagement of springs 117 and 118 completes an energizing circuit for the motor magnet relay 120 of the master switch E. This circuit extends from ground G′ through relay 120, segment 255, wiper 124, contact point 147 which corresponds to the trunk seized by the switch D, thence over conductor 148 and through springs 118 and 117, release magnet 119 to battery lead 144. The relay 120 is energized over this circuit, but being of comparatively high resistance, does not permit sufficient current to flow to energize the magnet 119. The relay 120, upon energizing, completes a circuit extending from ground $G^{12}$ through relay 149 and motor magnet 253 in multiple, interrupter springs 150 and relay springs 151 and 152 to battery lead 144. As soon as this circuit is closed the motor magnet 253 begins to operate in a manner similar to that of a buzzer to move the plungers of the idle switches D away from the trunk just seized. As soon as the ratchet wheel 254 has been moved one step by the magnet 253, a tooth on the wheel 123 forces springs 121 and 122 into contact, thereby maintaining the circuit of magnet 253 independently of relay 120. The motor magnet continues to advance the plungers until the spring 122 drops into the next notch of the wheel 123, whereby the circuit of the magnet 253 is broken, since by this time the wiper 124 has passed off of contact point 147 and allowed relay 120 to deënergize. If the next trunk after the one just seized by the switch D has been busy, the wiper 124 would have found the next contact connected to battery through its corresponding release magnet, the relay springs 152 and 151 would still have been in engagement when springs 121 and 122 were separated and the idle plungers would have been carried on to an idle trunk. It will be remembered that the relay 149 was included in an energizing circuit in multiple with magnet 253. The relay 149 is slow acting and consequently does not have time to deënergize during the short intervals when its circuit is opened at the interrupter springs 150. Thus the relay 149 remains in its operated position during the entire time the master switch is operating, thereby disconnecting the battery from the trip magnets 110 of all the trunk switches D of this group, so that no switch can be operated while its plunger is moving.

As has been previously explained, after an impulse is sent over the line which is connected with the binding post 85, the mechanism of the calling device stops for a short time, and then sends two impulses over the other side of the line. These two impulses pass out of the calling device through binding post 84, thence over trunk conductor 137, bank springs 111 and 112 of switch D, side switch wiper 154 and vertical line relay 155 of the selector F to the battery lead 144. Each time the relay 155 is energized a circuit is closed through the vertical magnet 156. This circuit extends from ground $G^2$ through springs 157 and 158, 159 and 160, and magnet 156 to battery lead 144. Since the digit called is 2 the vertical magnet 156 receives two impulses over the circuit just traced, operating to raise the switch shaft and wipers 161, 162 and 163 two steps to a position opposite the second row or level of bank contacts. A second impulse is now sent in over the rotary trunk 138, passing through springs 113 and 114, side switch wiper 164 of selector F and rotary line relay 165 to battery lead 144. The relay 165, upon energizing, closes a circuit from ground $G^2$ through springs 157 and 166 and private magnet 167 to battery lead 144. The private magnet, upon energizing and deënergizing, permits the side switch wipers to pass from first to second position in a well-known manner. When side switch wiper 168 engages its second-position contact point a circuit is extended from ground $G^2$ through said wiper 168, interrupter springs 169 and rotary magnet 170 to battery lead 144. The rotary magnet thereupon attracts its armature, which rotates the wipers 161, 162 and 163 one step, presses down the armature of the private magnet 167 and opens the circuit of its own magnet at the interrupter springs 169. When the rotary magnet circuit is thus opened, the rotary armature drops back, and if the first trunk line of the second level is idle, the armature of the private magnet falls back also, allowing the side switch to pass to third position. If the first trunk is busy, however, on account of having been seized by some other selector similar to selector F, a locking circuit is closed through the private magnet 167. This circuit extends from ground through the other occupying switch (not shown), private bank contacts of the busy trunk, private wiper 162 of selector F, relay 72, side switch wiper 173 and magnet 167 to battery lead 144. Sufficient current does not flow over this circuit to energize the relay 172, but the private magnet armature is held in its operated position, thus locking the side switch in second-position. The rotary magnet 170 then continues to be alternately energized and deënergized through the medium of its interrupter springs, until it has rotated the wipers onto the terminal of an idle trunk, whereupon the private magnet 167 becomes deënergized and allows the side switch to pass to third position. When the side switch wiper 168 leaves its second position contact point, the operating circuit of the rotary magnet 170 is broken. The passage of the side switch wipers 154 and 164 from second to third position disconnects the relays 155 and 165, from the line and extends the connection through to the second selector H. Also, as soon as the side switch reaches third position, the seized trunk is protected from being seized by another switch, by a guarding potential extending from ground $G^3$ through side switch wiper 173, relay 172 and private wiper 162 to the private bank contacts of the busy trunk in the banks of all switches by which it is accessible.

Figure 3:
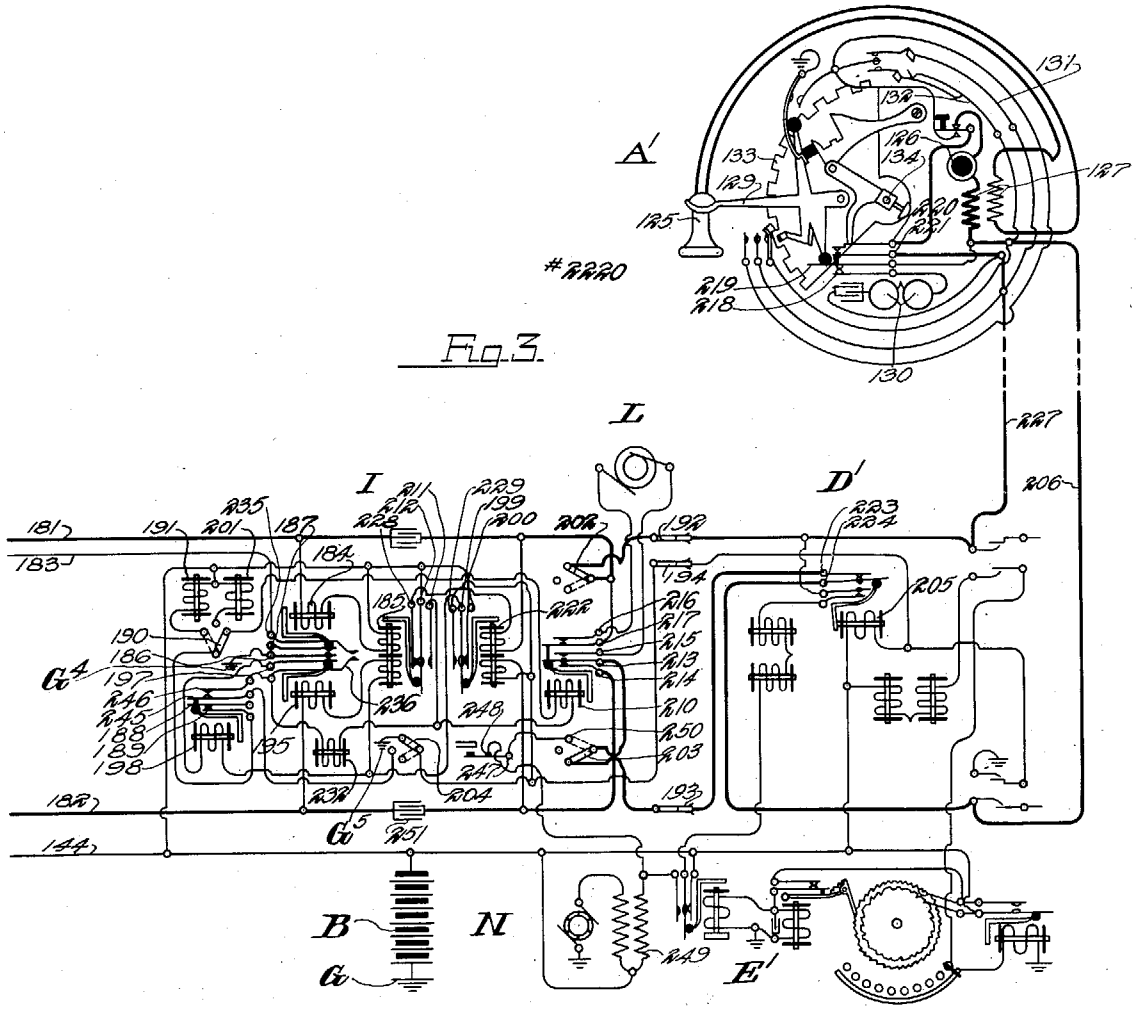
Figure 5:
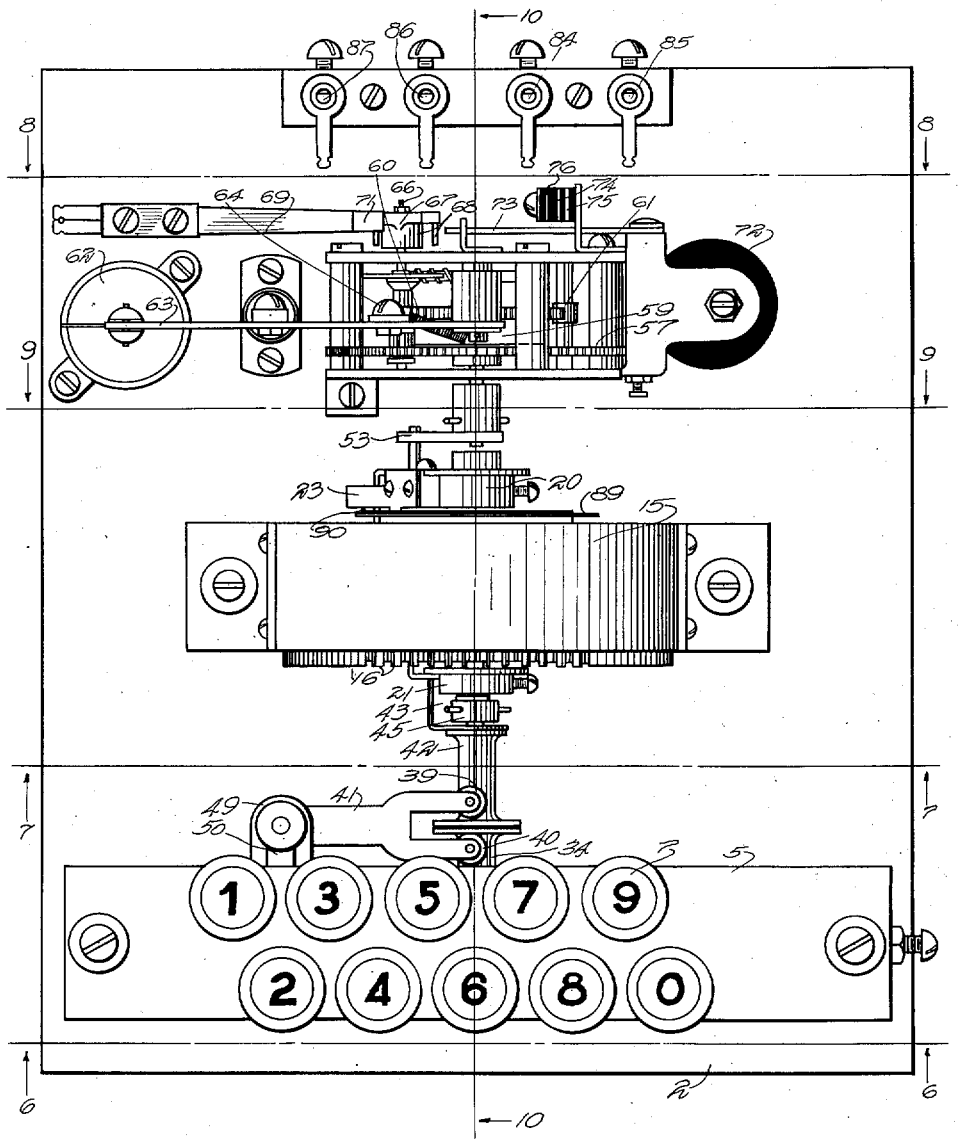
Fig. 5 is a plan view of my improved operator's calling mechanism.
Figure 7:
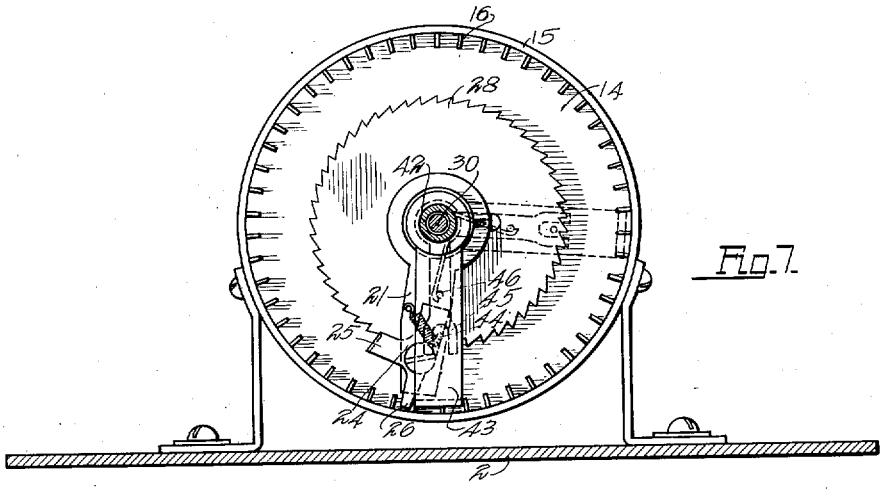
Fig. 7 is a view of a section on the line 7—7 of Fig. 5, but showing nothing beyond line 9—9.

After the last rotary impulse for the first digit 2 is sent in, the impulse mechanism stops for an instant to give the selector F time to find an idle trunk, after which it sends in the impulses for the second digit 2. The impulses for the second digit consist of one preliminary impulse over the rotary trunk conductor 138, and two vertical impulses over the trunk conductor 137, followed by another impulse over the rotary line 138. The preliminary rotary impulse over conductor 138 for the second digit, as well as for the succeeding digits, has no function, as the selector and connector switches are so constructed that the side switch cannot leave first position until after the vertical magnet has been operated one or more times, and it cannot leave second position until the shaft has been rotated one or more steps. The preliminary rotary impulse for the first digit is used to operate the trunk switch D. The vertical impulses for the second digit pass from ground at the calling device 106 over trunk conductor 137, through switches D and F, and through the vertical line relay 175 of the selector H to battery lead 144. The selector H operates in response to these impulses in the same manner as explained for the selector F to raise its wipers 176, 177 and 178 two steps. The next impulse over the rotary trunk conductor 138 passes through the selector F and through the rotary relay 179 of the selector H. The relay 179 causes the private magnet 180 to trip the side switch from first to second position just as in the case of the selector F. The wipers of the selector H are then rotated onto the terminals of a trunk line comprising conductors 181, 182 and 183 which lead to an idle connector switch I (Fig. 3). The connector I then operates in accordance with the impulses for the last two digits to complete the connection with the called line. The circuit for the two vertical impulses for the third digit 2 extends from ground at the calling device, over conductor 137, thence through the vertical line wipers 161 and 176 of selectors F and H, over trunk conductor 181 and through the vertical line relay 184 and upper winding of relay 185 of the connector I. The energization of relay 185 in response to these impulses is without function. Each time the vertical relay 184 is energized, however, a circuit is completed extending from ground $G^4$ through springs 186 and 187, springs 188 and 189, side switch wiper 190 and vertical magnet 191 to battery lead 144. The vertical magnet 191 receives two impulses over this circuit, operating to raise the wipers 192, 193 and 194 two steps to a position opposite the second row or level of their respective bank contacts. After the vertical magnet has completed its operation, the rotary line relay is energized by an impulse from ground at the calling device 106, over trunk conductor 138, through switches F and H, over trunk conductor 182 and through relay 195 and lower winding of relay 185 to battery lead 144. The relay 195, upon energizing and de-energizing, sends an impulse from ground $G^4$ through springs 186 and 197, private magnet 198 and springs 199 and 200 to battery lead 144. The private magnet 198 operates in response to this impulse to cause the side switch to pass from first to second position. In its second position, the side switch wiper 190 places the vertical line relay 184, in control of the rotary magnet 201 instead of the vertical magnet 191. The ten impulses for the last digit 0 now pass through the relay 184 which operates to close the circuit of the rotary magnet 201 ten times. With the exception of the magnet itself, this circuit is the same as that traced for the vertical magnet 191. The operation of the rotary magnet causes the wipers 192, 193 and 194, to be rotated ten steps onto the contacts of the called line. The final rotary impulse for the last digit causes the rotary relay 195 to again close the circuit of the private magnet 198, which in turn operates to cause the side switch to pass to third position, whereby the connection is extended to the called line by the wipers 202 and 203. The engagement of side switch wiper 204 with its third-position contact point provides a guarding potential upon the connector private bank contacts of the called line, and closes an energizing circuit for the cut-off relay 205 of the line switch D′. This guarding potential and energizing circuit extends from ground $G^5$ through side switch wiper 204, private wiper 194 and contact upon which it is resting, and thence to the corresponding contacts in the banks of all connectors which have access to the line #2220. From the private bank contacts the circuit also extends through relay 205 to the battery lead 144. The relay 205, upon energizing removes the short-circuit from the lines of the called substation and establishes a connection between the line conductor 206 and the bank contact upon which the wiper 193 is resting.

After the calling device has finished sending in impulses for the called number, the key K′ is restored to normal position, whereby the calling device 106 is disconnected and the calling and called substations are united over the heavy conductors shown in the drawings. In order to signal the called line the operator presses the button $K^3$ after the key K′ is restored. When the button $K^3$ is pressed it opens the bridge across the trunk through the relay 104 and grounds the vertical trunk conductor 137. The grounding of the conductor 137 causes the energization of the connector relays 184 and 185 in the same manner in which they were energized by the impulses for the last two digits. Since the side switch is now in third position, the energization of relays 184 and 185 completes a circuit from ground $G^4$ through springs 186 and 187, 188 and 189, side switch wiper 190, ringing relay 210 and springs 211 and 212 to battery lead 144. The relay 210 upon energizing, shifts spring 213 out of engagement with spring 214 and into contact with spring 215, and forces spring 217 into engagement with spring 216. By this operation the connection between the calling and called lines is opened on one side and the ringing generator L is bridged across the called line to ring the bells 130. When the called subscriber removes his receiver in response to this signal, the circuit of the ringer 130 is broken by the separation of springs 218 and 219 and the primary talking circuit is bridged across the line by the engagement of springs 220 and 221. When this occurs the called substation is provided with talking battery current over a circuit extending from ground $G^5$ at the connector I through side switch wiper 204, lower winding of back-ridge relay 222, ringer relay springs 214 and 213, side switch wiper 203, shaft wiper 193, springs 223 and 224 line 206, primary winding of the induction coil 127, transmitter 126, springs 220 and 221, line 227, wiper 192, side switch wiper 202, upper winding of relay 222 and springs 228 and 212 to battery lead 144. The relay 222 is energized by the current flowing over this circuit and operates to shift the connection of the lower winding of relay 185 from the battery lead 144 to ground at $G^5$ through side switch wiper 204. By this action a circuit is completed from ground $G^5$ through side switch wiper 204, springs 229 and 199, lower winding of relay 185, rotary relay 195, trunk conductors 182 and 138, sleeve of jack $j^2$ and plug $p'$, relay 104, springs 230 and 231, tip of plug $p'$ and jack $j^2$, trunk conductors 137 and 181, relay 184 and upper winding of relay 185 to battery lead 144. In this instance the current passes through the two windings of relay 185 in opposite directions, thereby producing no effect. The relays 184 and 195 are both energized, but without function at this time. At the cord C the relay 104 is energized to break the circuit of lamp 105, which signifies to the operator that the called subscriber has answered.

The hanging up of the receiver at the called substation after the conversation is completed destroys the circuit of the connector back-bridge relay 222. This relay 222, upon deënergizing, breaks the circuit of the supervisory relay 104 at the cord C, which relay allows its armature to fall back, causing the lamp 105 to be lighted, and thus giving the operator a disconnect signal. The operator receives a second disconnect signal when the calling subscriber hangs up his receiver, thereby breaking the circuit of the relay 100, which allows its armature to fall back to close the circuit of lamp 102. The operator thereupon removes the plugs $p$ and $p'$.

The removal of the plug $p'$ from the jack $j^2$ destroys the circuits of the busy lamps 107 and of the relay 108. The relay 108, upon deënergizing, connects the ground $G^6$ with both of the trunk conductors 137 and 138 and breaks the circuit of relay 109. The relay 109 being slightly slow acting holds its armatures in their operated position for a short time after the relay 108 is deënergized, and then allows them to drop back to remove the ground connection from the trunk conductors 137 and 138. The grounding of the conductors 137 and 138 causes the connector line relays 184 and 195 to be energized over circuits which have already been traced. The relay 185 is also energized at this time, since current flows through both of its windings in the same direction. The simultaneous energization of relays 184, 185 and 195 completes a circuit for the connector release magnet 232, said circuit extending from ground $G^7$ at the selector H, through side switch wiper 233, release relay 234, private wiper 178, conductor 183, springs 235 and 236, release magnet 232 and springs 211 and 212 to battery lead 144. The release magnet 232, upon enerigizing, causes the connector I to be immediately restored to normal position, whereupon the cut-off relay 205 of the line switch D′ becomes deënergized also. The energization of the release relay 234 of the selector H completes a circuit for its release magnet 237. This circuit extends from ground $G^3$ at the selector F, through side switch wiper 173, relay 172, private wiper 162, springs 238 and 239, and magnet 237 to battery lead 144. The energization of the relay 172 of the selector F completes an energizing circuit for the release magnet 240. This circuit extends from ground $G^8$ through springs 241 and 242 and magnet 240 to battery lead. The magnet 240, upon energizing, closes a circuit from ground $G^9$ through contact point 243, armature 244, springs 118 and 117, and release magnet 119 of the switch D to the battery lead 144. The release magnets 119, 240 and 237 of the switches D, F and H hold their armatures in position to release their respective switches when their circuits are broken following the deënergization of the trunk-release relay 109 (Fig. 1), whereby all apparatus employed in the connection is left in readiness for use in another call.

The foregoing is an explanation of how connection is obtained with an idle line. In case a line is already in use when it is called, connection is not completed therewith, and the calling subscriber receives a busy signal as follows: It has been shown that when a line is busy there is a guarding ground potential at the private contact of that line in the bank of each connector to which it is accessible. In case the wipers of the connector I are resting upon the contacts of a busy and therefore a guarded line when the final rotary impulse for the last digit is delivered, the side switch does not pass to third position, but the connector is released. The circuit for the release magnet in this instance extends from the guarded private bank contact, through wiper 194, side switch wiper 204 (which would then be in second position), springs 245 and 246 of the private magnet 198 (the circuit of which is closed in the usual manner by the operation of the rotary relay 195), magnet 232, and springs 211 and 212 of relay 185 (which is also energized by the rotary impulse), to battery lead 144. Since the connector is in normal position when the ringing button at the cord C is pressed, the consequent grounding of the vertical side of the line causes the vertical magnet 191 of the connector to be operated in a manner which has already been explained. As soon as the shaft of the connector is raised one step, the springs 247 and 248 are closed into contact, whereby the busy signaling machine N is connected with the calling line. The circuit over which the busy signaling current flows extends from the battery lead 144 through the secondary winding of the induction coil 249, springs 247 and 248, contact point 250, side switch wiper 203, ringer relay springs 213 and 214, condenser 251, trunk conductor 182, thence over the heavy conductors shown in the drawings to and through the calling substation and back over the other side of the line, and through the connector vertical line relay to the starting point. Upon hearing the busy signal, the calling subscriber will restore his receiver to the switch hook, thus giving the operator the disconnect signal, as has been explained.

What I claim as my invention is:

1. In a telephone system, a circular series of movable contacts, a rotary member for actuating said contacts, a set of keys for variably controlling the travel of said member, and means controlled by said contacts for transmitting electrical impulses.

2. In a telephone system, a circular set of movable contacts, a rotary member for actuating said contacts, a set of keys for variably controlling the travel of said member, an electrical impulse transmitting mechanism, and means for traversing said contacts to control said mechanism.

3. In a telephone system, an impulse transmitting device, a clock spring for operating said device, means including a magnet for winding up the spring, and automatic means for energizing said magnet intermittently in synchronism with the impulses transmitted by said device, and means for dividing the impulses into groups.

4. In a telephone system, a rotary impulse transmitting device, a spring for driving said device, means including a magnet for winding up said spring, means controlled by said impulse transmitting device for energizing said magnet each time an impulse is transmitted, so that the winding operation is synchronized with the transmission of the impulses, a set of movable contacts arranged in a circle, a circuit closing device for traversing said contacts and governed thereby for spacing apart the digits of any called number, a movable element for traversing and actuating the contacts, a set of keys for variably limiting the travel of said element, the said circuit closing device being adapted to follow at a variable distance behind the said element, means whereby the impulse transmitting device is automatically stopped whenever the said circuit closing device catches up with said element, and whereby said devices are started by the actuation of a key for the first digit.

5. In a telephone system, a calling device for transmitting impulses according to the digits of the called number, said device including a step-by-step-operated arm, and a continuously rotating arm adapted to follow after said first-mentioned arm and controlled thereby.

6. In a telephone system, a calling device including a plurality of keys, and movable in but one direction and adapted to be controlled by said keys, the movement of said arm varying in accordance with the key operated, means for transmitting impulses, and means controlled by said arm during said movement for controlling the number of said impulses transmitted.

7. In a telephone system, a calling device including a plurality of keys, an arm adapted to be rotated varying distances always in the same direction according to the key operated, means for transmitting impulses, and means controlled by said arm for governing the number of impulses transmitted.

8. In a telephone system, a calling device including a plurality of keys, a controlling arm adapted to be operated varying distances, depending upon the key operated, a second arm adapted to rotate continuously, means controlled by said second arm for transmitting impulses, and means controlled by said first arm for controlling the number of impulses transmitted.

9. In a telephone system, a calling device including a controlling arm, means for operating said controlling arm a plurality of steps, one for each digit of the called number, a second arm, means for operating said second arm with a continuous motion during the transmission of impulses, and means controlled by said second arm for transmitting said impulses.

10. In a telephone system, a calling device including an impulse wheel, a continuously operating arm for controlling the operation of said impulse wheel, and an intermittently operated arm for controlling the extent of operation of said first-mentioned arm.

11. In a telephone system, a calling device including an impulse wheel, a continuously operating arm for controlling the operation of said wheel, a controlling arm, a plurality of keys, for operating said controlling arm a plurality of steps, one for each digit of the called number, and means controlled by said controlling arm for governing the extent of operation of said first-mentioned arm.

12. In a telephone system, a calling device comprising a series of movable pins, an arm adapted to variously control said pins in accordance with the digits of the called number, a set of keys for controlling the operation of said arm, and means controlled by said pins for governing the transmission of impulses in accordance with the digits of the called number.

13. In a telephone system, a calling device comprising a circular series of longitudinally-movable pins, an arm adapted to be rotated over said pins, the movement of said arm being dependent upon the number of impulses desired to be transmitted, a plurality of keys for controlling the operation of said arm, means for transmitting impulses, and means controlled by said pins for controlling the number of impulses transmitted.

14. In a telephone system, a calling device, an arm adapted to be rotated, a spring for operating said arm, means controlled by said arm for transmitting impulses, and means operated in synchronism with said impulses for rewinding said spring.

15. In a telephone system, a calling device, an arm, spring-operated means for rotating said arm, an impulse wheel controlled by said arm, a magnet, means controlled by said magnet for rewinding said spring, and an energizing circuit for said magnet controlled by said impulse wheel.

16. In a telephone system, a calling device for transmitting impulses in accordance with the digits of the called number, an impulse wheel adapted to be rotated during the transmission of said impulses, a continuously operating arm for controlling the operation of said impulse wheel, and means for stopping said impulse wheel between the impulses representing the various digits of the called number.

17. In a telephone system, a calling device including a plurality of operating keys, and a controlling arm adapted to be operated by said keys, means in the device controlled by said arm for transmitting a plurality of series of impulses, and means in the device for spacing apart the series of impulses.

18. In a telephone system, a calling device, a plurality of keys, an arm controlled by said keys, the movement of said arm varying in accordance with the key operated, means for transmitting a plurality of series of impulses, means controlled by said arm for controlling the number of impulses in each series, and means for spacing apart each series of said impulses.

19. In a telephone system, a calling device including a plurality of keys, an arm adapted to be rotated varying distances, according to the key operated, means for transmitting a plurality of series of impulses, means controlled by said arm for governing the number of impulses in each series, and means for spacing apart each series of impulses.

20. In a telephone system, a calling device comprising a plurality of keys, a controlling arm adapted to be operated varying distances, depending upon the key operated, a second arm adapted to rotate continuously, means controlled by said second arm for transmitting a plurality of series of impulses, means controlled by said first arm for controlling the number of impulses in each series, and means for spacing apart each series of impulses.

21. In a telephone system, a calling device for transmitting a plurality of series of impulses, said device including a controlling arm, means for operating said controlling arm a plurality of steps, one for each series, a second arm, means for operating said second arm with a continuous motion during the transmission of impulses, means controlled by said second arm for transmitting said impulses, and means for separating each series of impulses.

22. In a telephone system, a calling device for transmitting a plurality of series of impulses, one for each digit of the called number, said device including an impulse wheel, a continuously operating arm for controlling the operation of said wheel, a controlling arm, a plurality of keys for operating said controlling arm a plurality of steps, one for each digit of the called number, means controlled by said controlling arm for governing the extent of operation of said first-mentioned arm, and means for separating each series of impulses.

23. In a telephone system, a metallic line circuit, a calling device including a plurality of keys, an arm adapted to be rotated varying distances, always in the same direction according to the key operated, means controlled by said device for transmitting a series of impulses over one side of said line circuit, followed by one or more impulses over the opposite side thereof, and means controlled by said arm for governing the number of impulses in said series.

24. In a telephone system, a metallic line circuit, a calling device including a plurality of keys, a controlling arm adapted to be operated varying distances, depending upon the key operated, a second arm adapted to rotate continuously, means controlled by said second arm for transmitting a series of impulses over one side of said line circuit, followed by one or more impulses over the opposite side thereof, and means controlled by said first arm for controlling the number of impulses in said series.

25. In a telephone system, a metallic line circuit, a calling device including a controlling arm, means for operating said controlling arm, a plurality of steps, one for each digit of the number called, a second arm, means for operating said second arm with a continuous motion, means controlled by said second arm for transmitting a plurality of series of impulses over one side of said line circuit, one series for each digit of the called number, and means likewise controlled by said arm for transmitting one or more impulses over the opposite side of said line circuit between each of said series of impulses.

26. In a telephone system, a metallic line circuit, a calling device including an impulse wheel, a continuously operating arm for controlling the operation of said impulse wheel, an intermittently operating arm for controlling the extent of operation of said first-mentioned arm, and means controlled by said impulse wheel for transmitting a series of impulses over one side of said line circuit, followed by one or more impulses over the opposite side thereof.

27. In a telephone system, a metallic line circuit, a calling device including an impulse wheel, a continuously operating arm for controlling the operation of said wheel, a controlling arm, a plurality of keys for operating said controlling arm a plurality of steps, one for each digit of the called number, means controlled by said controlling arm for governing the extent of operation of said first-mentioned arm, and means controlled by said impulse wheel for transmitting a plurality of series of impulses over one side of said line circuit, one for each digit of the called number and one or more impulses over the opposite side of said line circuit between each of said series of impulses.

28. In a telephone system, a metallic line circuit, a calling device including a circular row of longitudinally-movable pins, an arm adapted to be rotated over said pins, a plurality of keys for controlling the extent of operation of said arm, means for transmitting a plurality of series of impulses over one side of said line circuit, means controlled by said pins for governing the number of impulses in each series, and means for transmitting one or more impulses over the opposite side of said line circuit between each of said series of impulses.

29. In a signaling system, a line, an impulse transmitter therefor having a digit index, an impulse spacer and an impulse maker, and means whereby the operation of the digit index determines the operation of the impulse spacer, and whereby the latter prepares the impulse transmitter for spacing the impulses into groups, and means for preventing the operation of the index from interfering with the action of the impulse maker.

30. In a signaling system, a line, an impulse transmitter therefor having a digit index an impulse spacer and an impulse maker, means whereby operating the digit indicator operates the impulse spacer and whereby the latter prepares the impulse transmitter for spacing the impulses into groups, means whereby operating the digit indicator sets off the impulse maker in its operation and means for preventing the operation of the index from interfering with the action of the impulse maker.

31. In a signaling system, a line, an impulse transmitter therefor having a digit index, an impulse spacer and an impulse maker, and means whereby the operation of the digit index determines the operation of the impulse spacer, and whereby the latter prepares the impulse transmitter for spacing the impulses into groups and also determines the time of starting for the impulse maker without interfering with the action of the impulse maker.

32. In a signaling system, a line, an impulse transmitter therefor having a digit index, an impulse spacer and an impulse maker, and means whereby operating the digit index operates the impulse spacer, and whereby the latter prepares the impulse transmitter for spacing the impulses into groups and also causes the impulse maker to start its operation, and means for preventing the operation of the index from interfering with the action of the impulse maker.

33. In a signaling system, a line, an impulse transmitter therefor having a digit index, an impulse spacer and an impulse maker, and means whereby the operation of the digit index determines the operation of the impulse spacer and whereby the latter prepares the impulse transmitter for spacing impulses into groups and also causes the impulse maker to start its operation, and means for preventing the operation of the index from interfering with the action of the impulse maker.

34. In a signaling system, a line, a movable impulse transmitter associated therewith to perform a cycle of operations in calling a number, a more rapidly movable impulse spacer associated with the transmitter having mechanism adapted also to perform a cycle of operations during the same call, and adapted also to operate in advance of the transmitter to space the impulses without interfering with the operation of the impulse maker.

35. In a signaling system, a line, an impulse transmitter associated therewith and adapted to perform a cycle of operations in making a call, and an impulse spacer associated with the transmitter adapted also to perform a cycle of operations during the making of the same call, but in advance of the transmitter, to space the impulses of the transmitter into groups without interfering with the operation of the impulse maker.

36. An impulse transmitting device comprising a pair of contacts, an interrupter for said contacts, means for operating said interrupter to transmit impulses via said contacts, and electrical means for automatically controlling said interrupter to thereby divide the impulses into a plurality of groups.

37. An impulse transmitting device comprising a pair of contacts, an interrupter for said contacts, means for operating said interrupter to transmit impulses via said contacts, and a brake for automatically controlling said interrupter to thereby divide the impulses into a plurality of groups.

38. An impulse transmitting device comprising a pair of contacts, an interrupter for said contacts, means for operating said interrupter to transmit impulses via said contacts, and means for automatically controlling said interrupter to thereby divide the impulses into a plurality of groups, said means being in turn controlled by an electrical slow-acting device timed proportionately with the length of the spaces between the groups.

39. In an electric impulse transmitting system, an impulse transmitter, means for dividing the impulses into groups, an index for determining the number of impulses for each group, means for setting the impulse transmitter into operation as a result of the first operation of the index, and means for permitting the subsequent operation of the index without interfering with the operation of the impulse transmitter.

40. In a signaling system, a line, an impulse transmitter therefor having a digit index, an impulse spacer and an impulse maker, means whereby the operation of the digit index determines the operation of the impulse spacer and whereby the latter prepares the impulse transmitter for spacing the impulses into groups, said impulse spacer being normally at rest, and means for starting the same when the index is operated.

41. In a signaling system, a line, an impulse transmitter therefor having a digit index, an impulse spacer and an impulse maker, means whereby operating the digit indicator operates the impulse spacer, and whereby the latter prepares the impulse transmitter for spacing the impulses into groups, means whereby the digit indicator sets off the impulse maker in its operation, said impulse spacer being normally at rest, and means for starting the same when the index is operated.

42. In a signaling system, a line, an impulse transmitter therefor having a digit index, an impulse spacer and an impulse maker, means whereby the operation of the digit index determines the operation of the impulse spacer and whereby the latter prepares the impulse transmitter for spacing the impulses into groups and also determines the time of starting for the impulse maker, said impulse spacer being normally at rest, and means for starting the same when the index is operated.

43. In a signaling system, a line, an impulse transmitter therefor having a digit index, an impulse spacer and an impulse maker, means whereby operating the digit index operates the impulse spacer and whereby the latter prepares the impulse transmitter for spacing the impulses into groups and also causes the impulse maker to start its operation, said impulse spacer being normally at rest, and means for starting the same when the index is operated.

44. In a signaling system, a line, an impulse transmitter therefor having a digit index, an impulse spacer and an impulse maker, means whereby the operation of the digit index determines the operation of the impulse spacer and whereby the latter prepares the impulse transmitter for spacing the impulses into groups and also causes the impulse maker to start its operation, said impulse spacer being normally at rest, and means for starting the same when the index is operated.

45. In a signaling system, a line, a movable impulse transmitter associated therewith to perform a cycle of operations in calling a number, a more rapidly movable impulse spacer associated with the transmitter having mechanism adapted also to perform a cycle of operations during the same call and adapted also to operate in advance of the transmitter to space the impulses, said impulse spacer being normally at rest, and means for starting the same when the index is operated.

46. In a signaling system, a line, an impulse transmitter associated therewith and adapted to perform a cycle of operations in making a call, an impulse spacer associated with the transmitter adapted also to perform a cycle of operations during the making of the same call, but in advance of the transmitter, to space the impulses of the transmitter into groups, said impulse spacer being normally at rest, and means for starting the same when the index is operated.

47. In a signaling system, a line, an impulse transmitter therefor having a digit index, an impulse spacer and an impulse maker, means whereby the operation of the digit index determines the operation of the impulse spacer and whereby the latter prepares the impulse transmitter for spacing the impulses into groups, and mechanical means for preventing the operation of the index from interfering with the action of the impulse maker.

48. In a signaling system, a line, an impulse transmitter therefor having a digit index, an impulse spacer and an impulse maker, means whereby operating the digit indicator operates the impulse spacer and whereby the latter prepares the impulse transmitter for spacing the impulses into groups, means whereby operating the digit indicator sets off the impulse maker in its operation, and mechanical means for preventing the operation of the index from interfering with the action of the impulse maker.

49. In a signaling system, a line, an impulse transmitter therefor having a digit index, an impulse spacer and an impulse maker, means whereby operating the digit index operates the impulse spacer and whereby the latter prepares the impulse transmitter for spacing the impulses into groups and also causes the impulse maker to start its operation, and mechanical means for preventing the operation of the index from interfering with the action of the impulse maker.

50. In a signaling system, a line, an impulse transmitter therefor having a digit index, an impulse spacer and an impulse maker, means whereby the operation of the diget index determines the operation of the impulse spacer and whereby the latter prepares the impulse transmitter for spacing the impulses into groups, and also causes the impulse maker to start its operation, and mechanical means for preventing the operation of the index from interfering with the action of the impulse maker.

51. In a signaling system, a line, an impulse transmitter therefor having a digit index, an impulse spacer and an impulse maker, and mechanical means whereby the operation of the digit index determines the operation of the impulse spacer and whereby the latter prepares the impulse transmitter for spacing the impulses into groups and also determines the time for starting for the impulse maker without interfering with the action of the impulse maker.

52. In a signaling system, a line, a movable impulse transmitter controlled by a governor associated therewith to perform a cycle of operations in calling a number, a more rapidly movable impulse spacer associated with the transmitter having mechanism adapted also to perform a cycle of operations during the same call, and adapted also to operate in advance of the transmitter to space the impulses without interfering with the operation of the impulse maker.

53. In a signaling system, a line, an impulse transmitter controlled by a governor associated therewith and adapted to perform a cycle of operations in making a call, and an impulse spacer associated with the transmitter adapted also to perform a cycle of operations during the making of the same call but in advance of the transmitter, to space the impulses of the transmitter into groups without interfering with the operation of the impulse maker.

54. In a telephone system, a circular series of movable contacts, a rotary member for actuating said contacts, a set of keys, electromagnets controlled by said keys for variably controlling the travel of said member, and means controlled by said contacts for transmitting electrical impulses.

55. In a telephone system, a circular set of movable contacts, a rotary member for actuating said contacts, a set of keys, electromagnets controlled by said keys for variably controlling the travel of said member, an electrically-operated mechanism, and means for traversing said contacts to control said mechanism.

56. In a telephone system, a calling device for transmitting impulses according to the digits of the called number, said device including a step-by-step operating arm, electromagnetic means for controlling the operation of said arm, and a continuously rotating arm adapted to follow after said first-mentioned arm and controlled thereby.

57. In a telephone system, a calling device comprising a plurality of operating keys, a plurality of electromagnets and a controlling arm, said electromagnets controlled by said keys and adapted to operate said controlling arm, and means controlled by said arm for transmitting impulses according to the digits of the called number.

58. In a telephone system, a calling device comprising a series of movable pins, an arm adapted to variously control said pins in accordance with the digits of the called number, a set of keys, electromagnets controlled by said keys for controlling the operation of said arm, and means controlled by said pins for governing the transmission of impulses in accordance with the digits of the called number.

59. In a telephone system, a calling device comprising a circular series of longitudinally-movable pins, an arm adapted to be rotated over said pins, the movement of said arm being dependent upon the number of impulses desired to be transmitted, a plurality of keys, electromagnets controlled by the said keys for controlling the operation of said arm, means for transmitting impulses, and means controlled by said pins for controlling the number of impulses transmitted.

60. In a telephone system, a calling device including a plurality of operating keys, a plurality of electromagnets and a controlling arm, said electromagnets controlled by said keys and adapted to operate said controlling arm, means controlled by said arm for transmitting a plurality of series of impulses, and means for spacing apart the impulses of each series.

61. In a telephone system, a metallic line circuit, a calling device including a plurality of keys, electromagnets controlled thereby, an arm adapted to be controlled by said electromagnets, the movement of said arm varying in accordance with the key operated, means controlled by said device for transmitting a series of impulses over one side of said line circuit, followed by one or more impulses over the opposite side thereof, and means controlled by said arm for controlling the number of impulses in said series.

62. In a telephone system, a metallic line circuit, a calling device including a circular row of longitudinally-movable pins, an arm adapted to be rotated over said pins, a plurality of keys, electromagnets controlled by said keys for controlling the extent of operation of said arm, means for transmitting a plurality of series of impulses over one side of said line circuit, means controlled by said pins for governing the number of impulses in each series, and means for transmitting one or more impulses over the opposite side of said line circuit between each of said series of impulses.

63. An impulse transmitter comprising impulse mechanism, impulse control keys, a spring motor for said mechanism, a winding magnet for said motor, and means for causing an operation of the winding magnet and impulse mechanism responsive to actuation of any of said keys.

64. An impulse transmitter comprising impulse mechanism, a spring motor for said mechanism, a winding magnet for said motor, impulse control keys of different digit values, and means for causing an operation of the winding magnet and impulse mechanism responsive to actuation of any of said keys, whereby impulses are adapted to be transmitted corresponding in value to the digit value of the actuated key.

65. An impulse transmitter including rotatable impulse mechanism, a normally inoperative spring motor for driving said mechanism, a winding magnet for said motor, impulse control keys, and means for causing an operation of the winding magnet and single rotation of said impulse mechanism responsive to actuation of one of said keys 66. In a sender, the combination with a circuit interrupter, of a motor mechanism therefor, means for storing power in said motor mechanism, means for appropriating fractional quantities of power from said motor mechanism, and means for releasing said circuit interrupter to make use of such quantities of power for sending corresponding numbers of impulses.

67. An impulse transmitter comprising a pair of contacts, an interrupter for said contacts, means for operating said interrupter to transmit impulses via said contacts, a governor for controlling said interrupter, and electromagnetic means for storing energy in said operating means to operate said interrupter.

68. In a telephone system, an impulse repeater interposed between two stations for receiving impulses from one station and repeating the same to another station, said repeater comprising an impulse transmitter for sending out impulses, a governor for said transmitter, a mechanism for limiting the movement of said transmitter and for supplying energy to said mechanism, whereby impulses received by said repeater at varying rates of speed are repeated to said second station at a uniform rate of speed through the medium of said mechanism and governor.

Signed by me at Chicago, Cook county, Illinois, this 2d day of March, 1917.

JOHN G. BLESSING.